(12) United States Patent
Oruc et al.

(10) Patent No.: US 11,949,131 B2
(45) Date of Patent: Apr. 2, 2024

(54) BIPOLAR PLATE WITH IMPROVED TEMPERATURE DISTRIBUTION

(71) Applicant: Reinz-Dichtungs-GmbH, Neu-Ulm (DE)

(72) Inventors: Ahmet Oruc, Nattheim (DE); Bernd Gaugler, Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 190 days.

(21) Appl. No.: 17/338,572

(22) Filed: Jun. 3, 2021

(65) Prior Publication Data

US 2021/0384529 A1 Dec. 9, 2021

(30) Foreign Application Priority Data

Jun. 4, 2020 (DE) ...................... 20 2020 103 228.3

(51) Int. Cl.
*H01M 8/0267* (2016.01)
*H01M 8/0256* (2016.01)
*H01M 8/0265* (2016.01)
*H01M 8/0273* (2016.01)
*H01M 8/2432* (2016.01)

(52) U.S. Cl.
CPC ....... *H01M 8/0267* (2013.01); *H01M 8/0256* (2013.01); *H01M 8/0265* (2013.01); *H01M 8/0273* (2013.01); *H01M 8/2432* (2016.02)

(58) Field of Classification Search
CPC ............ H01M 8/0267; H01M 8/0256; H01M 8/0265; H01M 8/0273; H01M 8/2432; H01M 8/0258; H01M 8/0271; H01M 8/026; H01M 8/0263; Y02E 60/50
See application file for complete search history.

(56) References Cited

U.S. PATENT DOCUMENTS

2002/0102453 A1\* 8/2002 Suenaga ............... H01M 8/242
429/465

FOREIGN PATENT DOCUMENTS

| DE | 102007048184 | B3 | | 1/2009 |
| DE | 202014008157 | U1 | | 1/2016 |
| DE | 2014008157 | | \* | 2/2016 |
| DE | 202015106197 | U1 | | 2/2017 |
| DE | 202017103229 | U1 | | 8/2018 |

\* cited by examiner

*Primary Examiner* — Helen Oi K Conley
(74) *Attorney, Agent, or Firm* — McCoy Russell LLP

(57) ABSTRACT

The disclosure relates to a bipolar plate for an electrochemical system, and to an electrochemical system comprising a plurality of bipolar plates. The electrochemical system may be, for example, a fuel cell system, an electrochemical compressor, a redox flow battery, or an electrolyser. The bipolar plate comprising separator plates, an inlet, and an outlet. A separator plate comprising an active region.

16 Claims, 14 Drawing Sheets

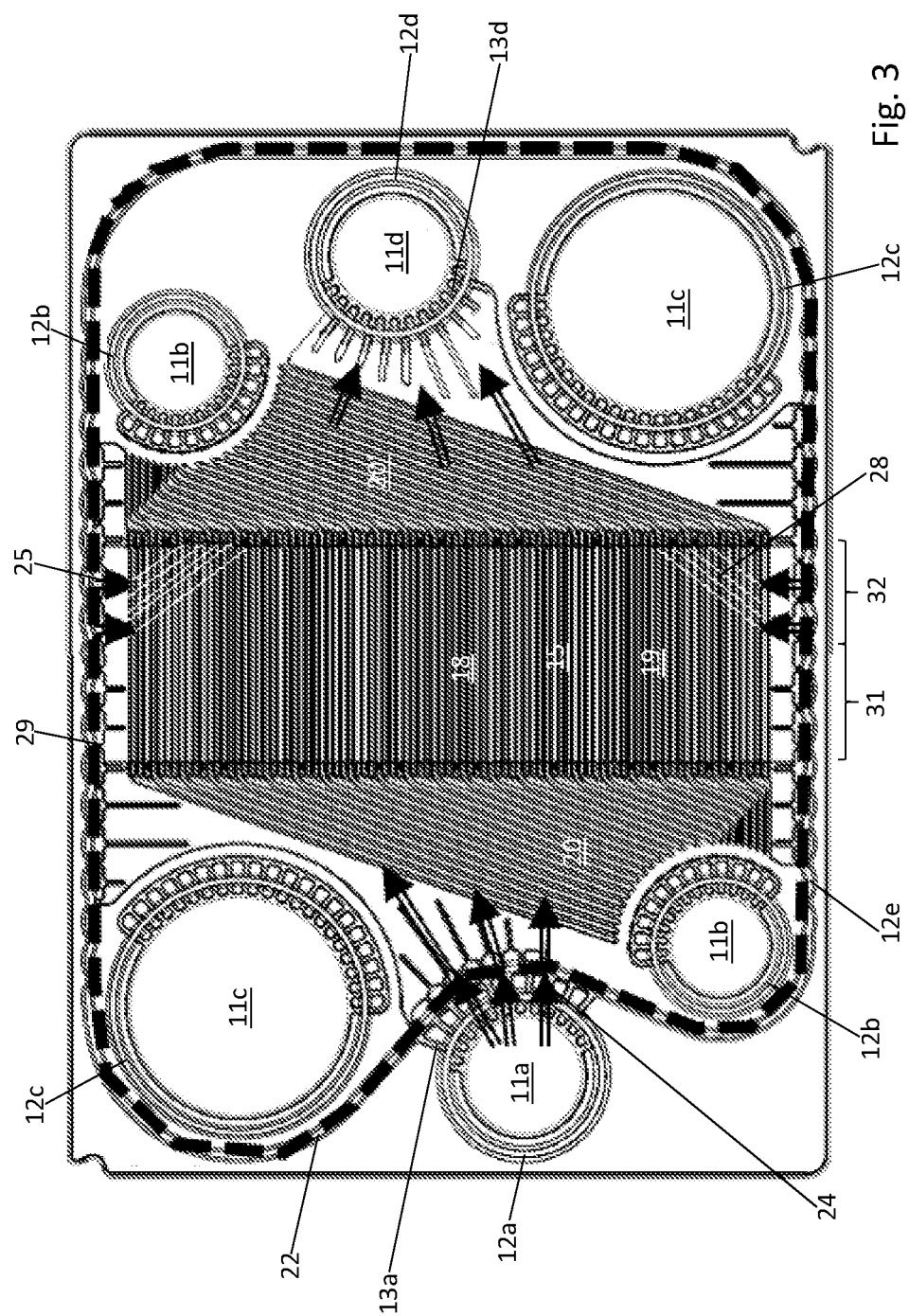

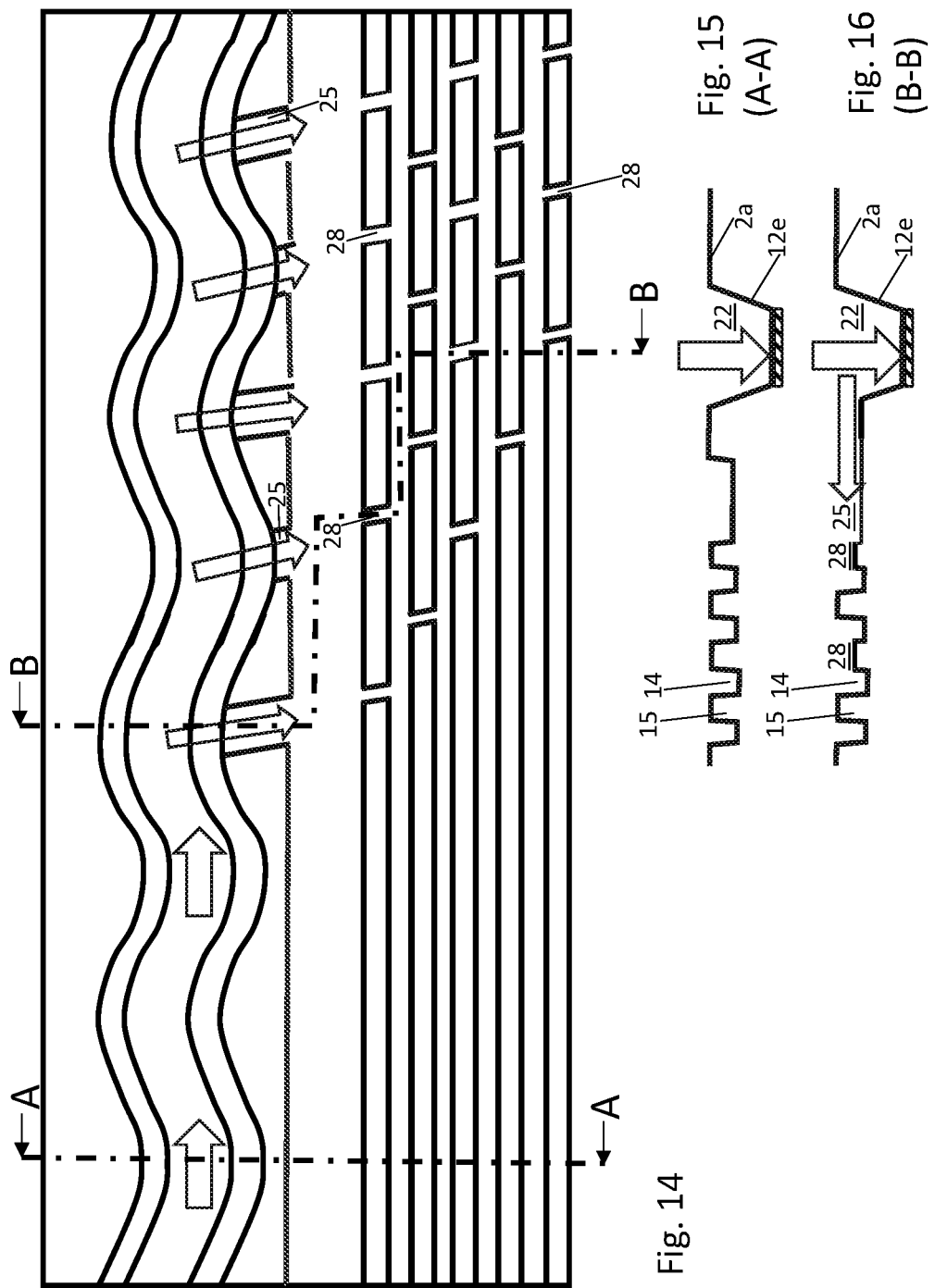

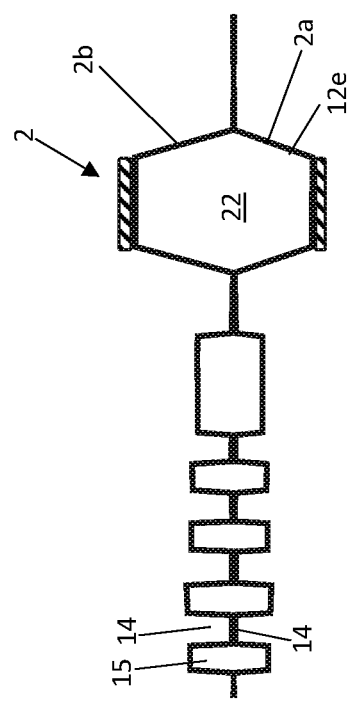
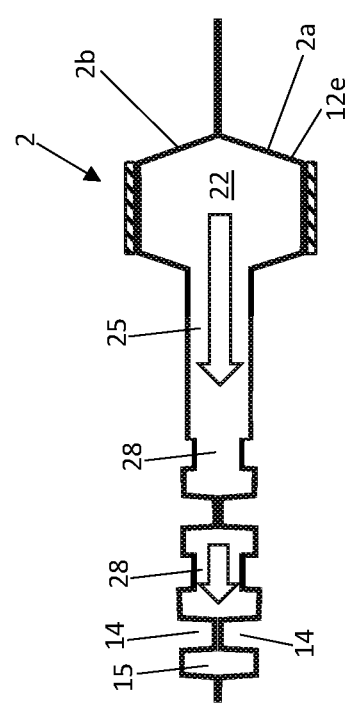

BIPOLAR PLATE WITH IMPROVED TEMPERATURE DISTRIBUTION

CROSS-REFERENCE TO RELATED APPLICATIONS

The present application claims priority to German Utility Model Application No. 20 2020 103 228.3, entitled "BIPOLAR PLATE WITH IMPROVED TEMPERATURE DISTRIBUTION," and filed on Jun. 4, 2020. The entire contents of the above-listed application are hereby incorporated by reference for all purposes.

TECHNICAL FIELD

The disclosure relates to a bipolar plate for an electrochemical system, and to an electrochemical system comprising a plurality of bipolar plates. The electrochemical system may be, for example, a fuel cell system, an electrochemical compressor, a redox flow battery, or an electrolyser.

BACKGROUND AND SUMMARY

Known electrochemical systems usually comprise a stack of electrochemical cells, which are each separated from one another by bipolar plates between the two separator plates. Such bipolar plates may serve for example for indirectly electrically contacting the electrodes of the individual electrochemical cells (for example fuel cells) and/or for electrically connecting adjacent cells (series connection of the cells). The bipolar plates are typically formed of two individual separator plates which are joined together. The separator plates of the bipolar plate may be joined together by a material bond, for example by one or more welded joints, such as laser-welded joints.

The bipolar plates and/or the separator plates may each have or form structures which are configured for example to supply one or more media to the electrochemical cells bounded by adjacent bipolar plates and/or to remove reaction products therefrom. The media may be fuels (for example hydrogen or methanol) or reaction gases (for example air or oxygen). Furthermore, the bipolar plates and/or the separator plates may include structures for guiding a cooling medium through the bipolar plate, for example through a cavity enclosed by the separator plates of the bipolar plate. Furthermore, the bipolar plates may be configured to transmit the waste heat that arises when converting electrical and/or chemical energy in the electrochemical cell, and also to seal the various media channels and cooling channels with respect to one another and/or with respect to the outside.

Barrier elements may be provided between the active region and a bead that delimits the active region towards the outside, said barrier elements being arranged and configured in such a way that they reduce or prevent a flow of reaction medium past the active region.

Furthermore, the bipolar plates usually each have at least one or more through-openings. Through the through-openings, the media and/or the reaction products can be conducted to the electrochemical cells bounded by adjacent bipolar plates of the stack or into the cavity formed by the separator plates of the bipolar plate, or can be conducted out of the cells or out of the cavity. The electrochemical cells typically also each comprise one or more membrane electrode assemblies (MEAs). The MEAs can comprise one or more gas diffusion layers which are usually orientated towards the bipolar plates and are formed e.g. as a metal non-woven or carbon non-woven.

It some cases, it has been found to be problematic that cooling medium for example is in part guided along undesired paths on the side of the separator plates that faces away from the electrochemically active side, for example in the cavity enclosed by the two separator plates of a bipolar plate. For example, it may happen that the cooling medium, which serves primarily for cooling the electrochemically active region of the separator plate or bipolar plate, is at least in part guided past the active region and thus does not contribute to cooling the active region, or does so only to an insufficient extent.

This unintentional coolant bypass may lead to undesired temperature spikes in the region of the electrochemical cells. In addition, an increased pumping capacity is required in order to increase the cooling medium guided through the active region. All these undesirable effects may possibly have an adverse effect on the efficiency of the electrochemical system.

The following publications by the applicant deal with the aforementioned problem: DE 10 2007 048 184 B3, DE 20 2017 103 229 U2, DE 20 2014 008 157 U1 and DE 20 2015 106 197 U1 and aim to reduce the coolant bypass.

The object of the disclosure is to achieve an improved temperature distribution of the bipolar plate so that the efficiency can be further increased.

This object is achieved according to the disclosure by the bipolar plate according to the present disclosure. Further developments are also described.

A bipolar plate for an electrochemical system is proposed, comprising:
two separator plates,
at least one inlet opening for introducing a cooling medium,
an outlet opening for discharging the cooling medium,
in at least a first of the separator plates
an active region having first structures for guiding a reaction medium along an outer side of the bipolar plate and second structures for guiding the cooling medium along an inner side of the bipolar plate,
a closed perimeter bead for sealing off at least the active region, the perimeter bead extending around the active region and the outlet opening and defining a bead interior.

The outlet opening is sealed off with respect to the bead interior of the perimeter bead so that a direct flow of the cooling fluid from the bead interior into the outlet opening is prevented.

By sealing off the outlet opening with respect to the bead interior, the cooling fluid is thus forced to flow via the active region towards the outlet opening. Since the cooling of the bipolar plate is required only or mainly in the active region anyway, a bypass flow is reduced and thus the cooling performance can be improved overall. A better, more homogeneous temperature distribution means that a more uniform and higher current density can be achieved, and thus the efficiency of the electrochemical cell can be increased.

It may be provided that the perimeter bead seals off the outlet opening with respect to the bead interior. In some embodiments, the part of the perimeter bead that faces towards the outlet opening may be responsible for the sealing function. Specifically, the perimeter bead may have a perimeter bead flank facing towards the outlet opening, which seals off the bead interior.

In some embodiments, the cooling fluid reaches the outlet opening substantially only via the second structures of the active region.

Each separator plate usually has two longitudinal sides and two transverse sides. Furthermore, each separator plate typically has a peripheral outer edge which laterally delimits the respective separator plate. The outer edge may be defined by the longitudinal sides and the transverse sides of the respective separator plate. The perimeter bead may be configured as an outermost sealing element at least along the longitudinal sides of the respective separator plate and in the region of the coolant outlet opening. In other words, the perimeter bead is the sealing element located closest to the outer edge of the respective separator plate at least along the longitudinal sides and in the region of the coolant outlet opening. Often at most one single, intrinsically closed perimeter bead that encloses the active region is provided per separator plate, namely the aforementioned perimeter bead. However, a further perimeter bead may also be provided, which extends around the aforementioned perimeter bead and optionally other elements, such as the inlet opening. The further perimeter bead likewise extends around the elements enclosed by the aforementioned perimeter bead.

According to another variant, the bipolar plate comprises a first bead arrangement arranged around the outlet opening at least in the first of the two separator plates, wherein a part of the bead arrangement that faces towards the perimeter bead and away from the active region seals off the outlet opening with respect to the bead interior. Often, a region of at least the first separator plate between the perimeter bead and the aforementioned part of the first bead arrangement is substantially unstructured and/or flat. In this region, the two individual plates usually rest flat against one another and contact one another. To ensure or assist this flat bearing, welded joints and/or welds, such as short welds, may additionally be provided in this region.

To seal off the outlet opening with respect to the bead interior, a weld or a welded joint may also be arranged between the outlet opening and the perimeter bead. The separator plates are connected to one another in this region by the weld or welded joint. The weld may be configured for example as a stitch weld or as a continuous weld. For example, the region between the perimeter bead and the outlet opening, for instance between the perimeter bead flank facing towards the outlet opening and the outlet opening, or between the perimeter bead and the bead facing towards the perimeter bead and surrounding the outlet opening, may have a sealing continuous weld which additionally prevents any crossover of cooling medium.

In addition, the inlet opening can be fluidically connected to the bead interior of the perimeter bead. While a fluidic connection of the inlet opening to the bead interior of the perimeter bead is avoided in the prior art, here it is deliberately proposed in embodiments to connect these two elements to one another.

This is because the inventors have realized that customary bipolar plates have an uneven temperature distribution during operation of the electrochemical system. In some embodiments, sections of the bipolar plates located in the vicinity of the inlet opening may be colder than sections of the bipolar plates located in the vicinity of the outlet opening since the cooling fluid heats up on the way from the inlet opening to the outlet opening. If some of the coolant is now guided past part of the active region via the bead interior, this portion of the coolant, which is still relatively cold, can be fed to the warmer section of the active region. Since, as described above, is sealed off with respect to the bead interior, the cooling fluid will thus pass via the active region to the outlet opening.

The bipolar plate may for example comprise at least one third structure leading from the inlet opening to the perimeter bead at least in the first of the two separator plates for guiding cooling medium from the inlet opening into the bead interior. It may be provided that the third structure is formed in one piece with the first separator plate and/or in one piece with the second separator plate. The third structure may also be formed in part by the first separator plate and in part by the second separator plate. In certain embodiments, the third structure may be configured as an embossed structure. From a manufacturing point of view, the last-mentioned variant offers the advantage that the third structure can be formed in one manufacturing step together with the first and the second structures, for example by embossing, deep drawing or hydroforming.

The bipolar plate may further comprise a second bead arrangement arranged around the inlet opening at least in the first of the two separator plates for sealing off the through-opening, more specifically for sealing off the inlet opening.

The first bead arrangement of the outlet opening and/or the second bead arrangement of the inlet opening and/or the perimeter bead usually each comprise a bead top and bead flanks arranged on each side of the bead top. In an embodiment, a substantially straight bead top extending at an angle to substantially straight bead flanks can be used, as well as a bead consisting of a curved top that merges seamlessly into likewise curved bead flanks. Intermediate shapes are also possible. Furthermore, the first bead arrangement, the second bead arrangement and/or the perimeter bead may project out of a plate plane of the bipolar plate. Like the perimeter bead, the first bead arrangement and/or the second bead arrangement are typically intrinsically closed.

It may be provided that each of the two bead flanks of the second bead arrangement have at least one passage for conducting the cooling medium through the bead flanks. In this case, the third structure may be configured as a conducting channel which, on an outer side of the second bead arrangement, adjoins the passage in the outer bead flank and is fluidically connected to the bead interior of the perimeter bead via a further passage in the bead flank of the perimeter bead. Depending on the embodiment, the conducting channel may be arranged facing away from or facing towards the active region. Some of the cooling fluid may therefore be deliberately conducted from the inlet opening into the bead interior so that part of the active region is bypassed.

To make the temperature distribution yet more even, it is also advantageous if the cooling fluid is conducted from the bead interior to the warmer parts of the bipolar plate and/or the active region. On the one hand, it is possible that this portion of the cooling fluid reaches the active region in an uncontrolled manner via leakage paths. However, the bipolar plate may be shaped in such a way that the cooling fluid is conducted to the active region in a targeted manner via the bead interior. By way of example, the bipolar plate has fourth structures leading away from the perimeter bead for conducting cooling medium from the bead interior to the active region. The fourth structures may be applied wherever more effective cooling is desired.

For example, the active region of at least the first separator plate comprises:
  a first section that faces towards the inlet opening and away from the outlet opening, and
  a second section that faces towards the outlet opening and away from the inlet opening.

The fourth structures leading away from the perimeter bead may be arranged between the perimeter bead and the second section so that at least some or most of the cooling medium flowing through the bead interior is guided past the first section of the active region and is conducted laterally into the second section.

For example, the active region of at least the first separator plate comprises:
- a front section that faces towards the inlet opening and away from the outlet opening,
- a rear section that faces towards the outlet opening and away from the inlet opening, and
- a middle section that is arranged between the front section and the rear section.

In this embodiment, the fourth structures leading away from the perimeter bead may be arranged between the perimeter bead and the middle section so that at least some or most of the cooling medium flowing through the bead interior is guided past the front section of the active region and is conducted laterally into the middle section.

As an alternative or in addition, the fourth structures leading away from the perimeter bead may be arranged between the perimeter bead and the rear section so that cooling medium flowing through the bead interior is guided past the front section and/or middle section of the active region and is conducted laterally into the rear section.

In addition, the fourth structures leading away from the perimeter bead may be arranged between the perimeter bead and the front section, wherein only some of the cooling medium flowing through the bead interior is guided past the front section and some of the cooling medium flowing through the bead interior is introduced laterally already in the front section.

The second structures often comprise channel structures for guiding the cooling fluid, which define a longitudinal flow direction of the cooling medium. The longitudinal flow direction may be given in the first or front section. In other words, the channel structures may be arranged parallel to one another in the first or front section of the active region. It is also possible that the channel structures for guiding the cooling fluid are wavy at least in part. Nonetheless, the wavy channel structures have a macroscopic flow direction which defines the longitudinal flow direction. In this case, the channel structures may be formed in both separator plates of the bipolar plate and for example have a phase offset with respect to one another, so that fluid crossovers between adjacent channels are possible in these regions.

Connecting channels for the cooling medium may be provided in the active region, said connecting channels fluidically connecting adjacent channel structures to one another and enabling a flow direction of the cooling medium at an angle to the longitudinal flow direction. The distribution of the cooling fluid can be further improved by virtue of said connecting channels. The connecting channels may be provided in the second, middle or rear section. It is also possible to provide the connecting channels at least in part in the first or front section.

The first structures in the active region on the outer side of the bipolar plate usually comprise channel structures for guiding the reaction medium. It may be provided that the channel structures comprise cross-sectional constrictions in some areas, which on the inner side of the bipolar plate form the connecting channels for the cooling medium.

In other variants, at least in the first separator plate, limiting elements are arranged between the active region and the perimeter bead. The limiting elements are typically configured in such a way that they reduce or prevent a flow of reaction medium on the outer side along the perimeter bead and past the active region. The limiting elements may form a fluidic connection between the bead interior and the inner side of the active region, or more specifically between the bead interior and the second structures of the active region, so that the cooling medium can flow from the bead interior towards the second structures.

In some embodiments, the perimeter bead extends in part between the inlet opening and the active region. Alternatively, the inlet opening may lie within a region enclosed by the perimeter bead.

Said inlet opening is usually fluidically connected to a distribution region, via which the cooling fluid is conducted to the second structures and/or to the active region of the bipolar plate.

In some embodiments, the bipolar plate comprises at least one further inlet opening for the cooling fluid. The at least one further inlet opening may only be fluidically connected to the bead interior of the perimeter bead, that is to say usually not to said distribution region. The at least one further inlet opening is for example fluidically connected to the bead interior of the perimeter bead so that cooling fluid can be fed from the further inlet opening via the bead interior at least to the second or the rear section. It may be provided that the number of inlet openings for the cooling medium is greater than the number of outlet openings. In one embodiment, there is exactly one outlet opening. It may be provided that there is a plurality of inlet openings. In some embodiments, the perimeter bead also encloses the at least one further inlet opening for the cooling fluid.

One thing that all the aforementioned embodiments of the disclosure have in common is that at least some of the cooling medium introduced via the inlet opening is conducted to the second structures via a distribution region, without significantly passing through the bead interior of the perimeter bead. This portion of the cooling medium ensures a basic cooling. The cooling medium conducted via the bead interior ensures a targeted additional cooling of individual regions and may additionally at least partially compensate the warming of this cooling medium that is used for the basic cooling. "Without significantly passing through the bead interior of the perimeter bead" means that, although a flow in the bead interior may take place from a passage in one bead flank to a passage, offset therefrom, in the other bead flank, a flow cannot take place in the bead interior beyond the region of the passages.

It should be noted that the cooling medium is understood to be a coolant which is not used as a reaction medium in the electrochemical system. The cooling medium often contains liquid water and/or glycol or mixtures of water and antifreeze agents, or consists of said substances. The cooling medium is usually in liquid form at room temperature, whereas the reaction media are usually in gas form at room temperature. The reaction medium may comprise fuels such as molecular hydrogen or methanol, reaction gases such as air or oxygen, and/or reaction products such as water vapour or depleted fuels.

The disclosure also relates to a bipolar plate for an electrochemical system, comprising:
- two separator plates,
- at least one inlet opening for introducing a cooling medium,
- an outlet opening for discharging the cooling medium,
- in at least a first of the separator plates
  - an active region having first structures for guiding a reaction medium along an outer side of the bipolar plate and second structures for guiding the cooling medium along an inner side of the bipolar plate, a closed perimeter bead for sealing off at least the active region, the perimeter bead extending around the active region and the outlet opening and defining a bead interior.

The outlet opening is sealed off with respect to the bead interior of the perimeter bead so that the cooling fluid reaches the outlet opening substantially only via the second structures of the active region, wherein the inlet opening is fluidically connected to the bead interior of the perimeter bead.

In some embodiments, a direct flow of the cooling fluid from the bead interior into the outlet opening is prevented. Said bipolar plate can be combined with features of the above described bipolar plate and vice versa.

The disclosure also proposes an electrochemical system comprising a plurality of bipolar plates of the type described above, which are arranged in a stack, wherein a membrane electrode assembly is arranged between adjacent bipolar plates of the stack.

The electrochemical system may be, for example, a fuel cell system, an electrochemical compressor, a redox flow battery, or an electrolyser.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Exemplary embodiments of the bipolar plate and of the electrochemical system are shown in the figures and will be explained in greater detail on the basis of the following description. In the figures:

FIG. 15 shows a section through the separator plate of FIG. 14 along the line A-A, FIG. 16 shows a section through the separator plate of FIG. 14 along the line B-B, FIG. 17 shows a sectional view, along the line A-A, of two separator plates according to FIG. 14 which are connected to one another, FIG. 18 shows a sectional view, along the line B-B, of two separator plates according to FIG. 14 which are connected to one another.

FIGS. 1-18 are shown approximately to scale.

Here and below, features which recur in different figures are denoted by the same or similar reference signs.

DETAILED DESCRIPTION

Figure 1:
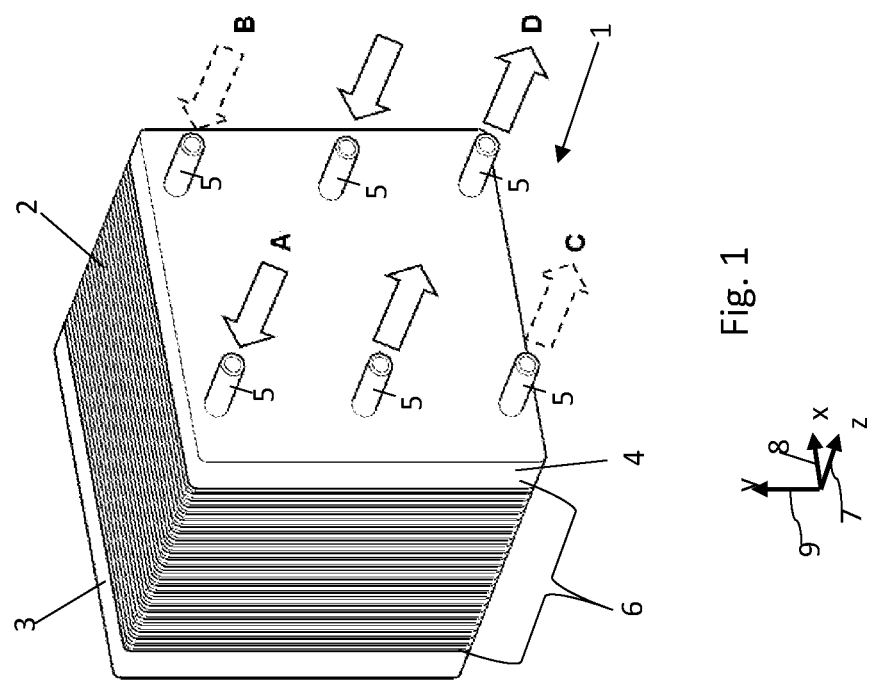
FIG. 1 schematically shows, in a perspective view, an electrochemical system comprising a plurality of bipolar plates arranged in a stack, FIG. 2 schematically shows, in a perspective view, two bipolar plates of the system according to FIG. 1 with a membrane electrode assembly (MEA) arranged between the bipolar plates, FIG. 3 schematically shows a plan view of a rear side of a separator plate which is a constituent part of one bipolar plate, FIG. 4 schematically shows a plan view of a rear side of a separator plate which is a constituent part of another bipolar plate, FIG. 5 schematically shows a plan view of a rear side of a separator plate which is a constituent part of another bipolar plate, FIG. 6 schematically shows an illustration of a coolant flow in another bipolar plate, FIG. 7 schematically shows an illustration of a coolant flow in another bipolar plate having additional coolant inlets, FIG. 8 schematically shows an illustration of a coolant flow in another bipolar plate having additional coolant inlets, FIG. 9 schematically shows an illustration of a coolant flow in another bipolar plate having additional coolant inlets, FIG. 10 schematically shows an illustration of a coolant flow in another bipolar plate having additional coolant inlets, FIG. 11 schematically shows an illustration of a coolant flow in another bipolar plate, FIG. 12 schematically shows an illustration of a coolant flow in another bipolar plate, FIG. 13 schematically shows an illustration of a coolant flow in one part of a bipolar plate having coolant-conducting channels, FIG. 14 schematically shows an illustration of a coolant flow in one part of a separator plate having coolant-conducting channels.

FIG. 1 shows an electrochemical system 1 comprising a plurality of structurally identical metal bipolar plates 2, which are arranged in a stack 6 and are stacked along a z-direction 7. The bipolar plates 2 of the stack 6 are usually clamped between two end plates 3, 4. The z-direction 7 will also be referred to as the stacking direction. In the present example, the system 1 is a fuel cell stack. Each two adjacent bipolar plates 2 therefore bound an electrochemical cell, which serves for example to convert chemical energy into electrical energy. To form the electrochemical cells of the system 1, a membrane electrode assembly (MEA) 10 is arranged between adjacent bipolar plates 2 of the stack (see for example FIG. 2). Each MEA 10 typically contains at least one membrane, for example an electrolyte membrane. Furthermore, a gas diffusion layer (GDL) may be arranged on one or both surfaces of the MEA.

In alternative embodiments, the system 1 may also be configured as an electrolyser, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyser, an electrochemical compressor or a redox flow battery may differ from the media used for a fuel cell system.

The z-axis 7, together with an x-axis 8 and a y-axis 9, spans a right-handed Cartesian coordinate system. The bipolar plates 2 each define a plate plane, each of the plate planes of the separator plates being oriented parallel to the x-y plane and thus perpendicular to the stacking direction or to the z-axis 7. The end plate 4 usually has a plurality of media ports 5, via which media can be fed to the system 1 and via which media can be discharged from the system 1. Said media that can be fed to the system 1 and discharged from the system 1 may comprise for example fuels such as molecular hydrogen or methanol, reaction gases such as air or oxygen, reaction products such as water vapour or depleted fuels, or coolants such as water and/or glycol.

Figure 2:
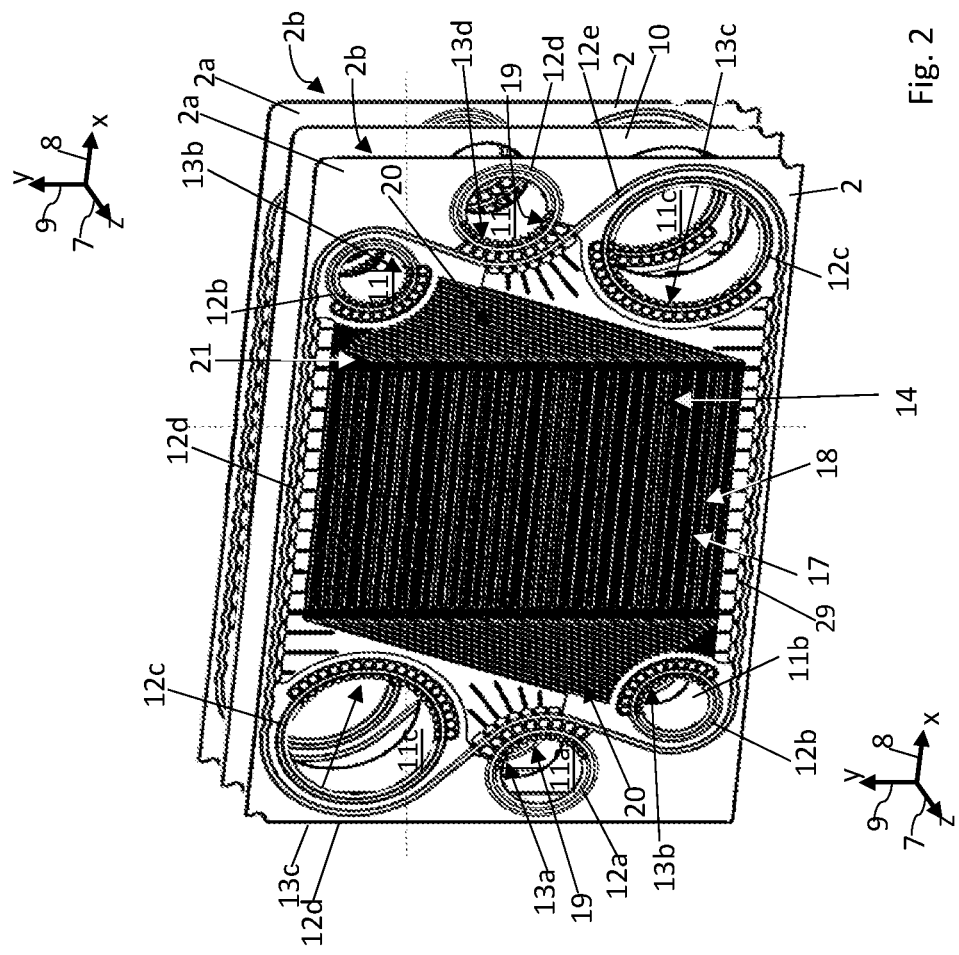

Both known bipolar plates, as shown in FIG. 2, and bipolar plates according to the disclosure, as shown from FIG. 3 onwards, can be used in an electrochemical system of the type shown in FIG. 1.

FIG. 2 shows, in a perspective view, two adjacent bipolar plates 2, known from the prior art, of an electrochemical system of the same type as the system 1 from FIG. 1, as well as a membrane electrode assembly (MEA) 10, likewise known from the prior art, which is arranged between said adjacent bipolar plates 2, the MEA 10 in FIG. 2 being largely obscured by the bipolar plate 2 facing towards the viewer. The bipolar plate 2 is formed of two separator plates 2a, 2b which are joined together by a material bond (see also for example FIGS. 16, 17), of which only the first separator plate 2a facing towards the viewer is visible in FIG. 2, said first separator plate obscuring the second separator plate 2b. The separator plates 2a, 2b may each be manufactured from a metal sheet, for example from a stainless-steel sheet. The separator plates 2a, 2b may for example be welded to one another, for example by laser welds. The separator plates 2a, 2b often have a rectangular shape. Each separator plate 2a, 2b usually has two longitudinal sides, which in FIG. 2 extend in the x-direction, and two transverse sides, which in FIG. 2 extend in the y-direction. Furthermore, each separator plate 2a, 2b typically has a peripheral outer edge, which laterally delimits the respective separator plate 2a, 2b. The outer edge may be defined by the longitudinal sides and the transverse sides of the respective separator plate 2a, 2b.

The separator plates 2a, 2b typically have through-openings, which are aligned with one another and form the through-openings 11a-d of the bipolar plate 2. When a plurality of bipolar plates of the same type as the bipolar plate 2 are stacked, the through-openings 11a-d form lines which extend through the stack 6 in the stacking direction 7 (see FIG. 1). Typically, each of the lines formed by the through-openings 11a-d is fluidically connected to one of the ports 5 in the end plate 4 of the system 1. For example, coolant can be introduced into the stack 6 via the lines formed by the through-openings 11a, while the coolant is discharged from the stack via the through-openings 11d. The through-openings 11a, 11d can also be referred to as the inlet opening 11a and outlet opening 11d, respectively. In contrast, the lines formed by the through-openings 11b, 11c may be configured to supply fuel and reaction gas to the electrochemical cells of the fuel cell stack 6 of the system 1 and to discharge the reaction products from the stack. The media-guiding through-openings 11a-d are substantially parallel to the plate plane.

In order to seal off the through-openings 11a-d with respect to the interior of the stack 6 and with respect to the surrounding environment, the first separator plates 2a usually have sealing arrangements in the form of sealing beads 12a-d, which are each arranged around the through-openings 11a-d and completely surround the through-openings 11a-d. On the rear side of the bipolar plates 2, facing away from the viewer of FIG. 2, the second separator plates 2b have corresponding sealing beads for sealing off the through-openings 11a-d (not shown).

In an electrochemically active region 18, the first separator plates 2a have, on the front side thereof facing towards the viewer of FIG. 2, a flow field 17 with first structures 14 for guiding a reaction medium along the outer side (or also front side) of the separator plate 2a. In FIG. 2, these first structures 14 are defined by a plurality of webs and channels extending between the webs and delimited by the webs. On the front side of the bipolar plates 2 facing towards the viewer of FIG. 2, the first separator plates 2a additionally have a distribution or collection region 20. The distribution or collection region 20 comprises structures 21 which are configured to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures 21 of the distribution or collection region 20 are likewise defined by webs and channels extending between the webs and delimited by the webs.

The sealing beads 12a-12d have passages 13a-13d, of which the passages 13a, 13d are formed both on the underside of the upper separator plate 2a and on the upper side of the lower separator plate 2b, while the passages 13b are formed in the upper separator plate 2a and the passages 13c are formed in the lower separator plate 2b. By way of example, the passages 13a, 13d enable a passage of coolant between the through-opening 12a, 12d and the distribution or collection region 20, so that the coolant reaches the distribution or collection region 20 between the separator plates 2a, 2b and is guided out therefrom.

Furthermore, the passages 13b enable a passage of hydrogen between the through-opening 12b and the distribution or collection region on the upper side of the upper separator plate 2a; these passages 13b are characterized by perforations facing towards the distribution or collection region and extending at an angle to the plate plane. Therefore, hydrogen for example flows through the passages 13b from the through-opening 12b to the distribution or collection region on the upper side of the upper separator plate 2a, or in the opposite direction. The passages 13c enable a passage of air for example between the through-opening 12c and the distribution or collection region, so that air reaches the distribution or collection region on the underside of the lower separator plate 2b and is guided out therefrom. The associated perforations are not visible here.

The first separator plates 2a also each have a further sealing arrangement in the form of a perimeter bead 12e, which extends around the flow field 17 of the active region 18, the distribution or collection region 20 and the through-openings 11b, 11c and seals these off with respect to the through-openings 11a, 11d, that is to say with respect to the coolant circuit, and with respect to the environment surrounding the system 1. The second separator plates 2b each comprise corresponding perimeter beads 12e. The structures of the active region 18, the distributing or collecting structures of the distribution or collection region 20 and the sealing beads 12a-e are each formed in one piece with the separator plates 2a and are integrally formed in the separator plates 2a, for example in an embossing, hydroforming or deep-drawing process. The same applies to the corresponding distributing structures and sealing beads of the second separator plates 2b. Each sealing bead 12a-12e may have in cross-section at least a bead top and two bead flanks. However, a substantially angular arrangement between these elements is not necessary; a curved transition may also be provided.

While the sealing beads 12a-12d have a substantially round profile, the perimeter bead 12e has various sections which are shaped differently. For instance, the profile of the perimeter bead 12e may have at least two wavy sections.

The two through-openings 11b or the lines through the plate stack of the system 1 that are formed by the through-openings 11b are each fluidically connected to one another via passages 13b in the sealing beads 12b, via the distributing structures of the distribution or collection region 20 and via the flow field 17 in the active region 18 of the first separator plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures and via a corresponding flow field on an outer side of the second separator plates 2b facing away from the viewer of FIG. 2. To this end, first structures 14, which may be channel structures, for guiding the relevant media are provided in each of the active regions 18.

In contrast, the through-openings 11a, 11d or the lines through the plate stack of the system 1 that are formed by the through-openings 11a, 11d are each fluidically connected to one another via a cavity 19 that is enclosed or surrounded by the separator plates 2a, 2b. This cavity 19 serves to guide a coolant through the bipolar plate 2, which may be used for cooling the electrochemically active region 18 of the bipolar plate 2. The coolant thus serves mainly to cool the electrochemically active region 18 of the bipolar plate 2. Starting from an inlet opening 11a, the coolant flows through the cavity 19 in the direction of an outlet opening 11d. As the coolant, use is often made of mixtures of water and antifreeze agents. However, other coolants are also conceivable. To better guide the coolant or cooling medium, second structures 15 are present on the inner side of the bipolar plate 2. These are not visible in FIG. 2 since they extend for example on the surface of the separator plate 2a that faces away from the viewer; they are thus located opposite the abovementioned first structures 14 on the other surface of the separator plate 2a. In the active region 18, the second structures 15 guide the cooling medium along the inner side of the bipolar plate in the direction of the outlet opening 11d. The second structures 15 typically comprise channel structures for guiding the cooling fluid, which define a longitudinal flow direction of the cooling medium.

In FIG. 2, both through-openings 11a, 11d are located outside of a region enclosed by the closed perimeter beads 12e. The perimeter beads 12e of the separator plates 2a, 2b furthermore form a bead interior 22, which here is connected to the cavity 19.

One common problem with previous bipolar plates 2 is that coolant which is fed in for example through the through-opening 11a is guided to the second structures 15 on the rear side of the electrochemically active region 18. In principle, this occurs because the bead 12a once again has passages 13a in its flanks so that the coolant is guided in the plate plane towards the second structures 15 on the rear side of the electrochemically active region 18. The problem here is that often some of the coolant may also enter the bead interior 22 of the peripheral perimeter bead 12e since this bead interior 22 is crossed as the coolant is fed in. Some of the coolant branches off in the bead interior 22 instead of continuing to flow in the direction of the active region 18, and is then guided past the active region 18 and reaches the outlet opening 11d via the bead interior 22, as a result of which this portion of the coolant does not contribute to cooling the active region 18, or does so only to an insufficient extent.

Another problem with the arrangement shown in FIG. 2 may be that the coolant coming from the inlet opening 11a provides greater cooling in a section of the active region 18 that faces towards the inlet opening 11a and away from the outlet opening 11d than in a section of the active region 18 that faces away from the inlet opening 11a and towards the outlet opening 11d because the coolant had initially not yet been heated by the active region 18. Due to the resulting spatially inhomogeneous temperature distribution, the active region 18 is cooled to varying degrees in the flow direction of the coolant, as a result of which the fuel cell system 1 is not operated with optimal efficiency.

The inventors have realized that the coolant bypass through the bead interior 22 can be used in a targeted manner to reduce the inhomogeneous temperature distribution of the active region 18.

The disclosure will be described below with reference to the exemplary embodiments shown in FIGS. 3-17.

FIG. 3 shows a plan view of an embodiment of a rear side of a separator plate 2a, 2b of a bipolar plate 2 according to the disclosure. In contrast to the bipolar plate 2 of FIG. 2, the closed perimeter bead 12e extends around not only the flow field 17 of the active region 18, the distribution region 20, the collection region 20' and the through-openings 11b, 11c, but also the outlet opening 11d. This significantly reduces the likelihood of the cooling fluid flowing from the bead interior 22 of the perimeter bead 12e directly to the outlet opening 11d. As described herein, an intrinsically closed perimeter bead forms a closed loop or a complete perimeter without gaps or breaks. For example, FIG. 3 depicts intrinsically closed perimeter bead 12e forming a closed loop along and spaced a distance from the outer edge of the separator plate 2a, 2b. The outlet opening 11d is additionally sealed off with respect to the bead interior 22 of the perimeter bead 12e by the perimeter bead flank facing towards the outlet opening 11d, so that a direct flow of the cooling fluid from the bead interior 22 into the outlet opening 11d is prevented. As a result, the cooling fluid reaches the outlet opening 11d substantially only via the second structures 15 of the active region 18. The fact that coolant can enter the bead interior 22, but due to the separation between the outlet opening 11d and the perimeter bead 12e can reach the outlet opening 11d from the bead interior 22 only via the second structures 15, is therefore actively exploited here.

The sealing-off of the outlet opening 11d with respect to the bead interior 22 can take place for example by way of a bead flank of the perimeter bead 12e that faces towards the outlet opening. The first bead arrangement 12d arranged around the outlet opening 11d may also seal off the outlet opening 11d with respect to the bead interior 22. In certain embodiments, a part of the bead arrangement 12d that faces towards the perimeter bead 12e and away from the active region 18, such as a bead flank of the bead arrangement 12d, may seal off the outlet opening 11d with respect to the bead interior 22.

The perimeter bead 12e may be configured as an outermost sealing element at least along the longitudinal sides of the respective separator plate 2a, 2b and in the region of the coolant outlet opening 11d. In other words, the perimeter bead 12e is the sealing element located closest to the outer edge of the respective separator plate at least along the longitudinal sides and in the region of the coolant outlet opening 12d. Often at most one single, closed perimeter bead 12e that encloses the active region is provided per separator plate, namely the aforementioned perimeter bead shown in FIGS. 3-18. The closed perimeter bead 12e may be intrinsically closed. However, a further perimeter bead (not shown) may also be provided, which extends around the aforementioned perimeter bead 12e and optionally other elements, such as the inlet opening 11a. The further perimeter bead then likewise extends around the elements enclosed by the aforementioned perimeter bead 12e.

Furthermore, in order to seal off the outlet opening with respect to the bead interior 22, one or more welded joints may be provided, which are arranged between the outlet opening 11d and the perimeter bead 12e.

Figure 4:
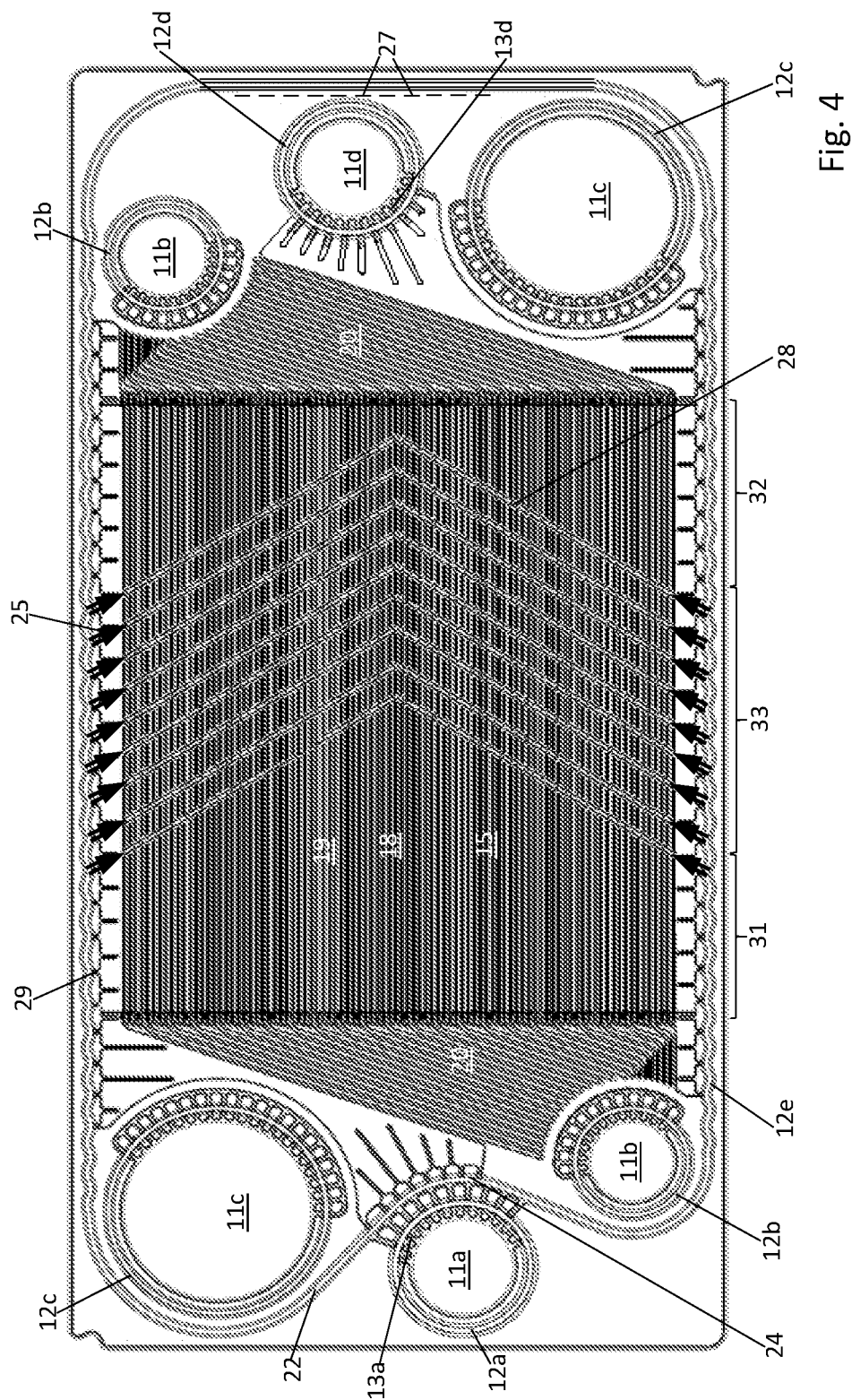
Figure 5:
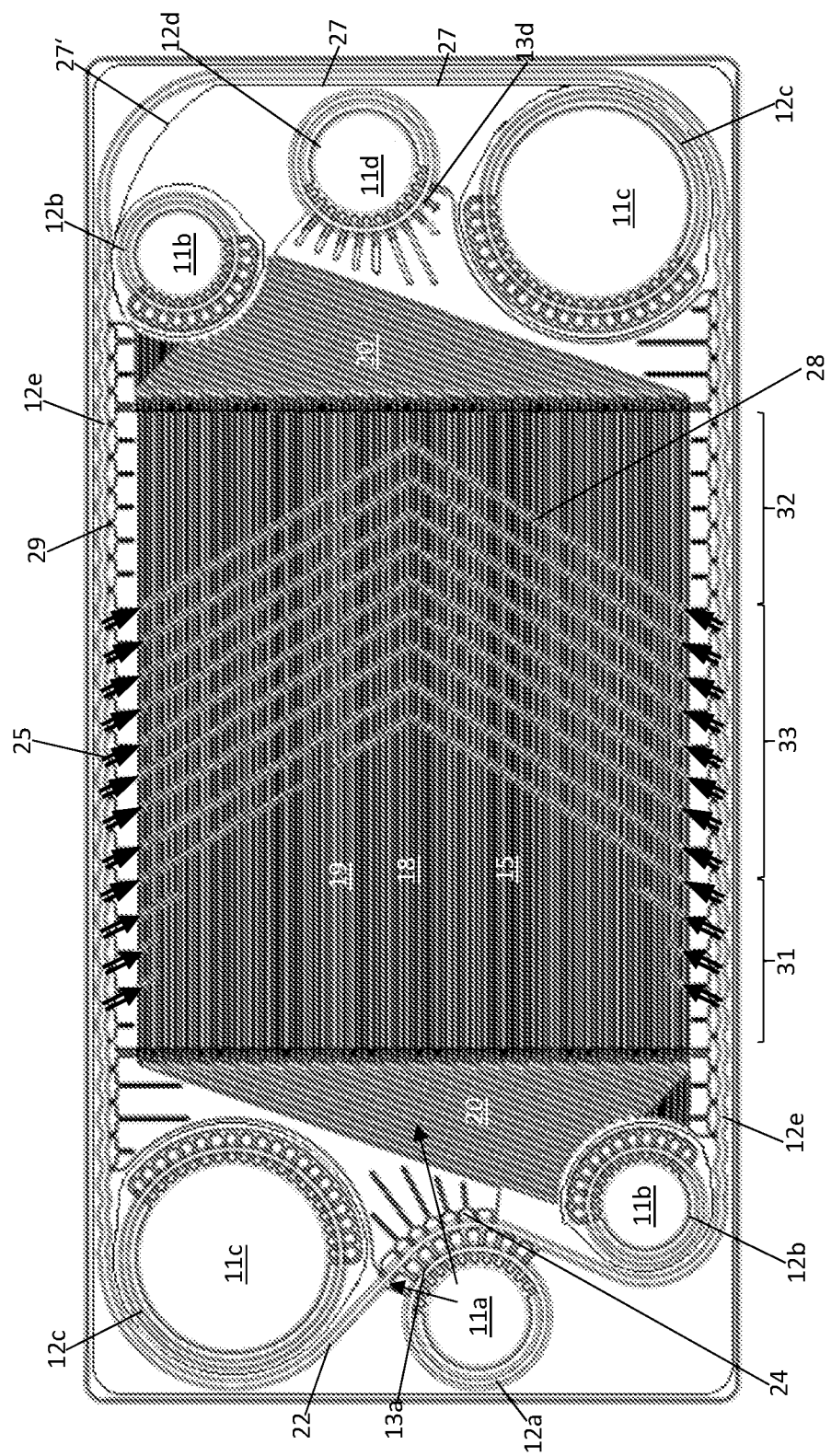
Figure 6:
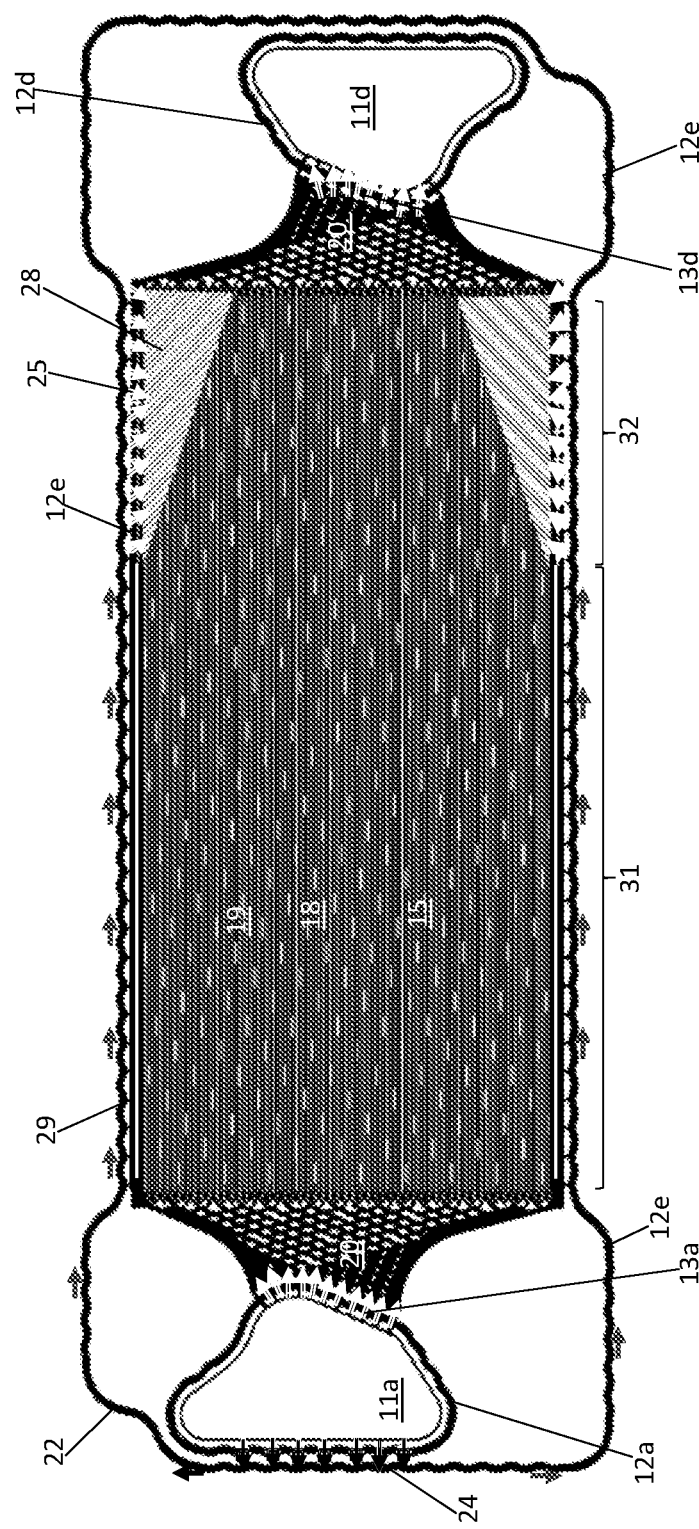

FIG. 4 shows such welded joints 27, which in part are configured as non-sealing welded joints (stitch welds). These ensure that the separator plates 2a, 2b bear flat against one another in the intermediate space between the outlet opening 11d and the perimeter bead, and thus the sealing effect of the beads 12d and 12e is enhanced. In FIG. 5, on the other hand, a sealing continuous welded joint 27 is provided, which tightly adjoins further sealing welded joints between the separator plates 2a, 2b. A welded joint 27' extending around the outside is also shown, and this may likewise be present in all the other embodiments. The welded joints or welds may be configured as laser-welded joints or laser welds.

Depending on the embodiment, the coolant may flow on different paths from the inlet opening 11a to the outlet opening 11d.

Since the outlet opening 11d is sealed off with respect to the bead interior 22, the coolant is forced to flow at least via part of the active region 18 to the outlet opening 11d. As a result, a greater proportion of coolant, namely all the coolant, can be used for temperature control purposes.

It is advantageous if targeted measures are taken to convey the cooling fluid into the bead interior 22.

For instance, it may be provided in one variant that the inlet opening 11a is fluidically connected to the bead interior 22. By way of example, at least one third structure 24 leading from the inlet opening 11a to the perimeter bead 12e is provided for guiding cooling medium from the inlet opening 11a into the bead interior 22. The third structure 24 may be configured as a conducting channel which connects the inlet opening 11a to the bead interior 22, cf. FIGS. 6, 7, 11, 12.

In certain embodiments, each of the two bead flanks of the second bead arrangement 12a has at least one passage for conducting the cooling medium through the bead flanks. On an outer side of the second bead arrangement 12a, the third structure configured as a conducting channel may adjoin the passage in the bead flank. The third structure 24 configured as a conducting channel may be fluidically connected to the bead interior 22 of the perimeter bead 12e via a further passage in the bead flank of the perimeter bead 12e.

FIGS. 6, 7, 11 and 12 indicate the flow direction of the coolant from the inlet opening 11a, via the third structure 24, into the bead interior 22. In FIGS. 6, 7, 11 and 12, the third structure 24 points away from the active region 18 and thus faces away from the active region 18. In alternative embodiments, the third structure 24 may also face towards the active region 18, as shown in FIGS. 3-5, or may enclose an angle of 90° with the active region 18.

While in FIGS. 3-5 the closed perimeter bead 12e extends in part between the inlet opening 11a and the active region 18 and thus does not enclose the inlet opening 11a, in the embodiments of FIGS. 6 to 12 the closed perimeter bead 12e extends around not only the flow field 17 of the active region 18, the distribution region 20, the collection region 20', the through-openings 11b, 11c and the outlet opening 11d, but also the inlet opening 11a. In FIGS. 6-12, the flow direction of the cooling fluid is highlighted by arrows, with some elements such as the openings 11b, 11c having been omitted for the sake of clarity. The position of some elements, such as beads 12a, 12d, 12e, is also indicated by reference signs in FIGS. 6-12.

The active region 18 may be divided into different subsections. For example, the active region 18 may have a front section 31 that faces towards the inlet opening 11a and away from the outlet opening 11d, and a rear section 32 that faces towards the outlet opening 11d and away from the inlet opening 11a. The front section 31 and the rear section 32 are sometimes also referred to as the first and second section 31, 32, respectively. The front section 31 may adjoin the rear section 32 (see FIG. 3). In some cases, a middle section 33 may be present, which is arranged between the front section 31 and the rear section 32 (see FIGS. 4, 5 and 9) and adjoins the two sections 31, 32.

To further influence the flow direction of the coolant, the bead interior 22 may be connected to the active region 18 via at least one fourth structure 25. Specifically, fourth structures 25 leading away from the perimeter bead 12e may be provided for conducting cooling medium from the bead interior 22 to the active region 18. FIGS. 13-18 show such fourth structures 25. The fourth structures 25 may be arranged at different points between the perimeter bead 12e and the active region 18 and may be provided wherever there is a need for increased cooling. Depending on requirements, the fourth structures 25 are arranged between the perimeter bead 12e on the one hand and the front, rear and/or middle section 31, 32, 33 on the other hand.

If embodiments of the fourth structures 25 are provided for example only in the middle and rear section 33, 32, cooling medium flowing through the bead interior 22 will be guided past the front section 31 of the active region 18 and will be conducted laterally into the middle and rear section 33, 32.

If embodiments of the fourth structures are provided for example only in the rear section 32, cooling medium flowing through the bead interior 22 will be guided past the front section 31 and, if present, the middle section 33 of the active region 18 and will be conducted laterally into the rear section 32. This scenario is shown in FIGS. 6-8 and 10-12.

FIGS. 15-18 show sections along the lines A-A and B-B shown in FIG. 14. While only individual separator plates 2a are shown in FIGS. 15 and 16, FIGS. 17 and 18 shows sectional views of the bipolar plate 2.

It can be seen in the sectional view of FIGS. 15 and 17 that the bead interior 22 of the perimeter bead 12e has no fluidic connection to the active region 18. In FIGS. 16 and 18, on the other hand, the bead interior 22 and the active region 18 are fluidically connected to one another by fourth structures 25.

If embodiments of the fourth structures 25 are provided for example only in the middle and rear section 33, 32, cooling medium flowing through the bead interior 22 will be guided past the front section 31 of the active region and will be conducted laterally into the middle and rear section 33, 32.

Figure 9:
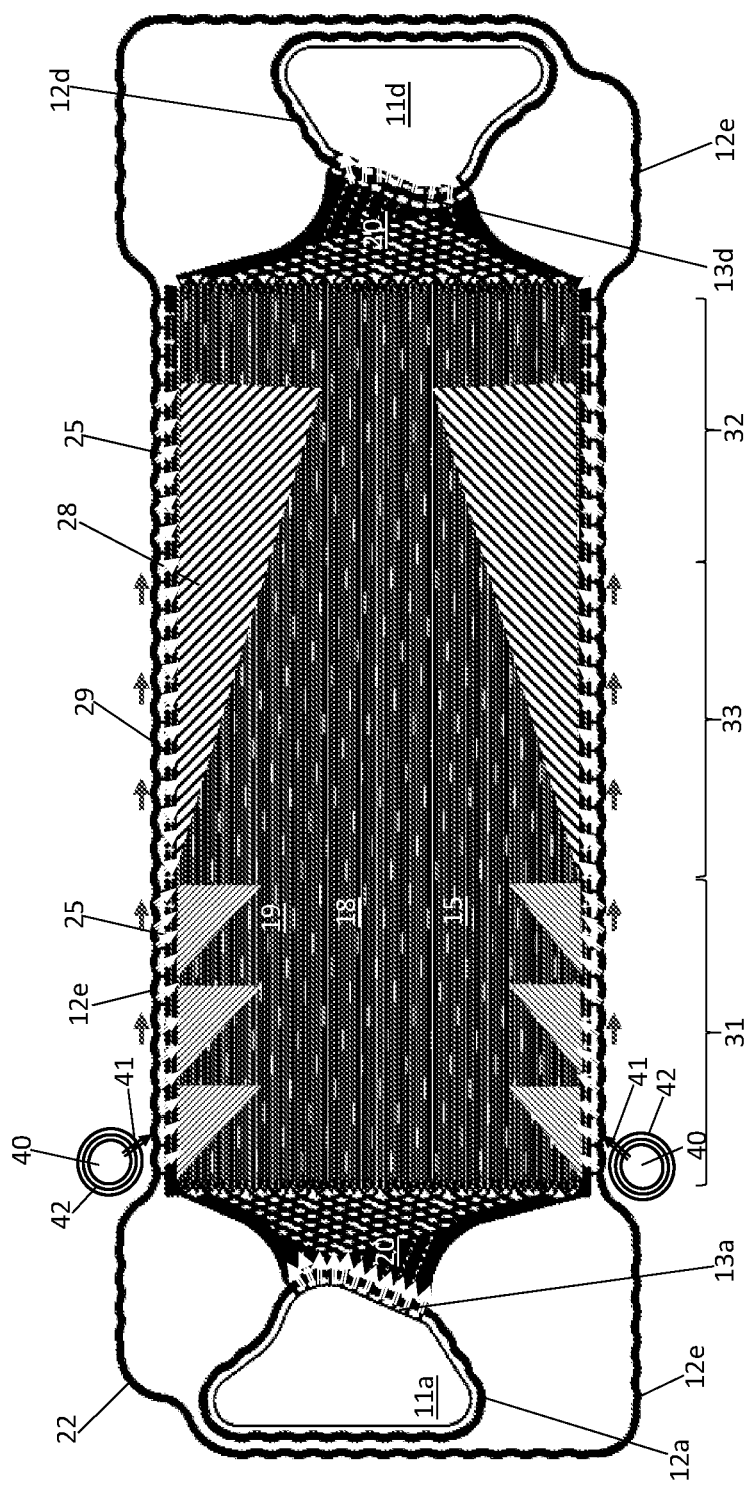
Figure 12:
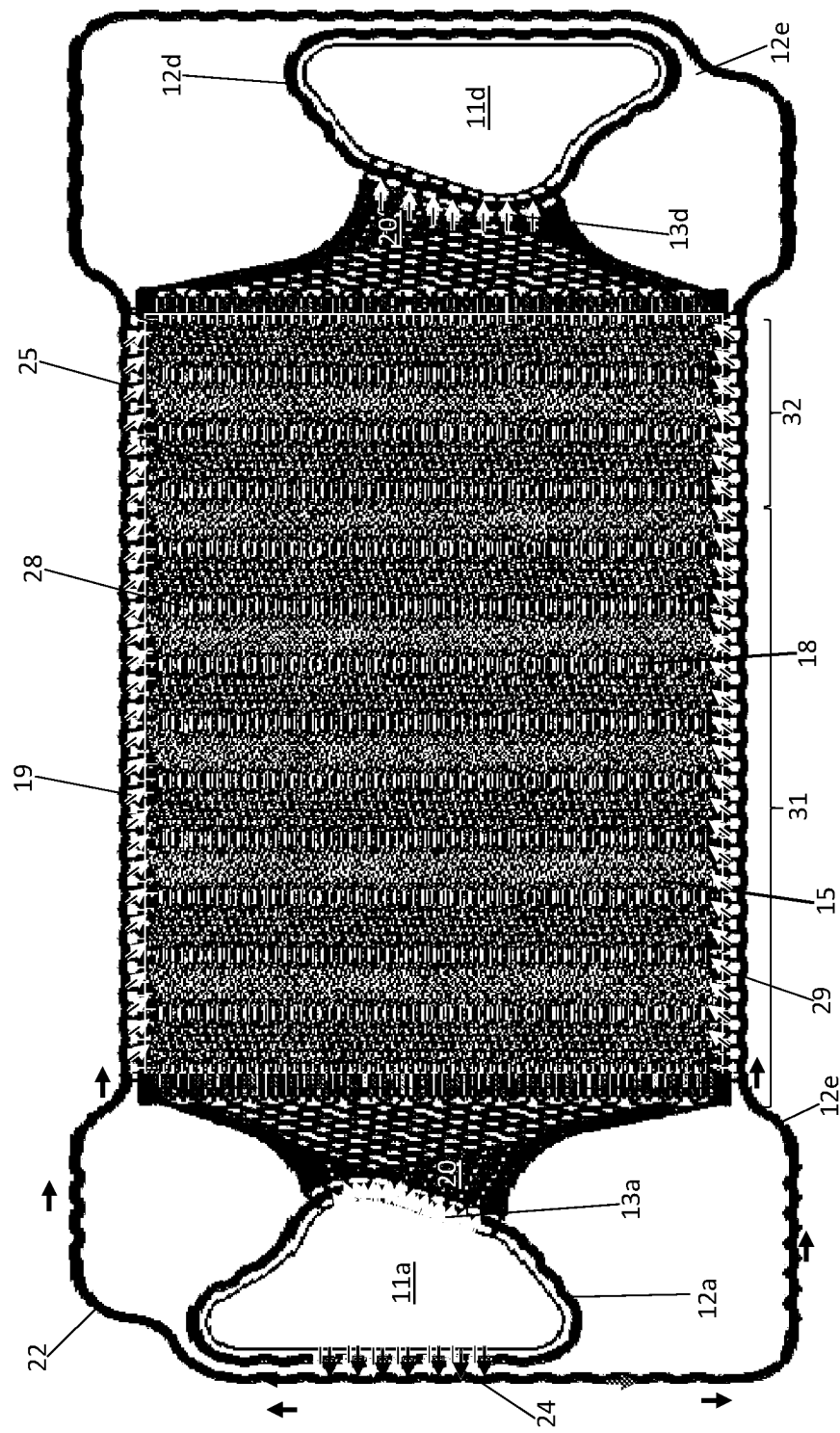

In some embodiments, the fourth structures 25 are present in each of the aforementioned sections 31, 32 and optionally 33, cf. FIGS. 9 and 12, so that only some of the cooling medium flowing through the bead interior 22 will be guided past the front section 31 and some of the cooling medium flowing through the bead interior 22 will be introduced laterally already in the front section 31.

Figure 13:
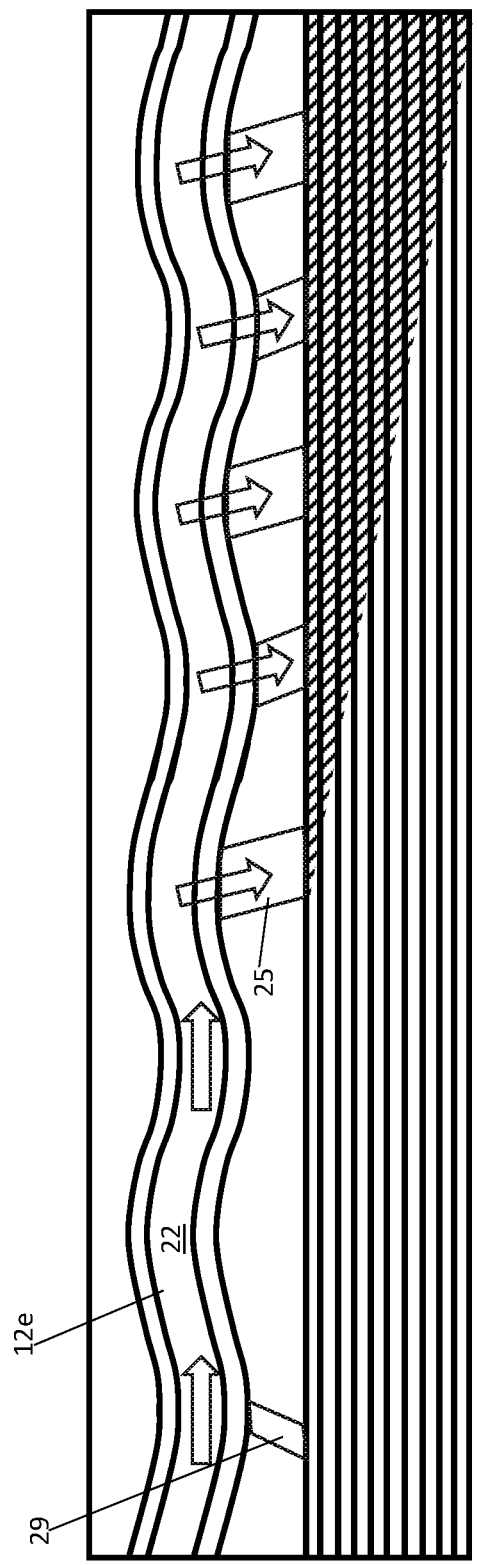

As shown in FIGS. 13 and 14, the fourth structures 25 may be arranged at an angle to a main direction of extension of the perimeter bead 12e. The main direction of extension results here from the connecting line of the inflection points of the neutral fibre of the bead top of the perimeter bead 12e. In FIG. 13, only one limiting element 29 is shown for sake of clarity although a larger number may be given as is shown in the preceding figures. In FIG. 14, also for clarity reasons, they are not shown at all. From FIG. 13, one can see that the fourth structures 25 may be broader than the limiting elements 29, e.g. by at least 10%, by at least 25% or by at least 50%.

To further improve the guidance of the coolant in embodiments of the active region 18, connecting channels 28 for the cooling medium may be provided in the active region 18. The connecting channels 28 fluidically connect adjacent channel structures 15 to one another. In certain embodiments, the connecting channels 28 may enable a flow direction of the cooling medium at an angle to the longitudinal flow direction. As a result, the cooling medium can be conducted in a targeted manner to warmer zones of the active region 18.

The channel structures of the first structures 14 already mentioned above, that is to say the channel structures on the surface of a separator plate 2a, 2b that faces away from the cavity 19, may comprise cross-sectional constrictions in some areas, which on the inner side of the bipolar plate 2 form the connecting channels 28 for the cooling medium. The connecting channels 28 are clearly visible in FIGS. 14, 16 and 18.

The shape, number, orientation (angle) and size of the fourth structures 25 may be identical or different for each section 31, 32 or 33.

In the first separator plate 2a and/or in the second separator plate 2b, limiting elements 29 may be arranged between the active region 18 and the perimeter bead 12e. The limiting elements 29 are configured in such a way that they reduce or prevent a flow of reaction medium on the outer side along the perimeter bead 12e and past the active region 18. In certain embodiments, the limiting elements 29 may form a fluidic connection between the bead interior 22 and the inner side, that is to say the cavity 19 of the active region, so that the cooling medium can flow from the bead interior 22 towards the second structures 15. It may be provided that the limiting elements 29 and the fourth structures 25 are formed on opposite sides of the separator plates 2a, 2b; in other words, the fourth structures 25 on the side of the bipolar plate 2 that conducts the cooling medium form the limiting elements 29 on the side of the bipolar plate 2 that conducts the reaction medium.

The third structures 24 and/or the fourth structures 25 and/or the limiting elements 29 may be formed in one piece in at least one of the two separator plates 2a, 2b or in part in each of the two separator plates 2a, 2b. The third structures 24 and/or the fourth structures 25 and/or the limiting elements 29 may be configured as embossed structures. In certain embodiments, the third structures 24 and/or the fourth structures 25 and/or the limiting elements 29 may be formed in one manufacturing step together with the first and the second structures 14, 15, for example by embossing, deep drawing or hydroforming a metal layer.

The embodiments shown in FIGS. 3 to 6, 11 and 12 each have only a single inlet opening 11a for the cooling medium. In contrast to this, the embodiments shown in FIGS. 7 to 10 have at least one additional cooling inlet opening 40. Although two cooling inlet openings 40 are shown in each of FIGS. 7 to 10, the number of cooling inlet openings 40 may nevertheless be larger or smaller. The additional cooling inlet openings 40 differ from the inlet opening 11a in that they have no direct fluidic connection to the active region 18 or to the distribution region 20. Instead, embodiments of the cooling inlet openings 40 are only connected via cooling channels 41 directly to the bead interior 22. Each cooling inlet opening 40 is usually surrounded by a corresponding, closed bead 42 and is sealed off from the surrounding environment by the bead 42. The closed bead 42 may be intrinsically closed. The additional cooling inlet openings 40 may lie inside the region enclosed by the perimeter bead 12e (cf. FIGS. 7, 8) or outside of the region enclosed by the perimeter bead (cf. FIGS. 9, 10). Furthermore, the cooling inlet openings 40 may be arranged upstream of the active region, see FIGS. 7, 8. Alternatively, the cooling inlet openings 40 may be arranged at the level of the front section 31 (cf. FIG. 9) or the middle section 33 (cf. FIG. 10). By providing further cooling inlet openings 40, the cooling capacity of the cooling inlet openings 40 can be at least partially separated from the cooling capacity of the inlet opening 11a. As a result, the cooling capacity provided via the bead interior 22 of the perimeter bead 12e can be selectively controlled.

Figure 7:
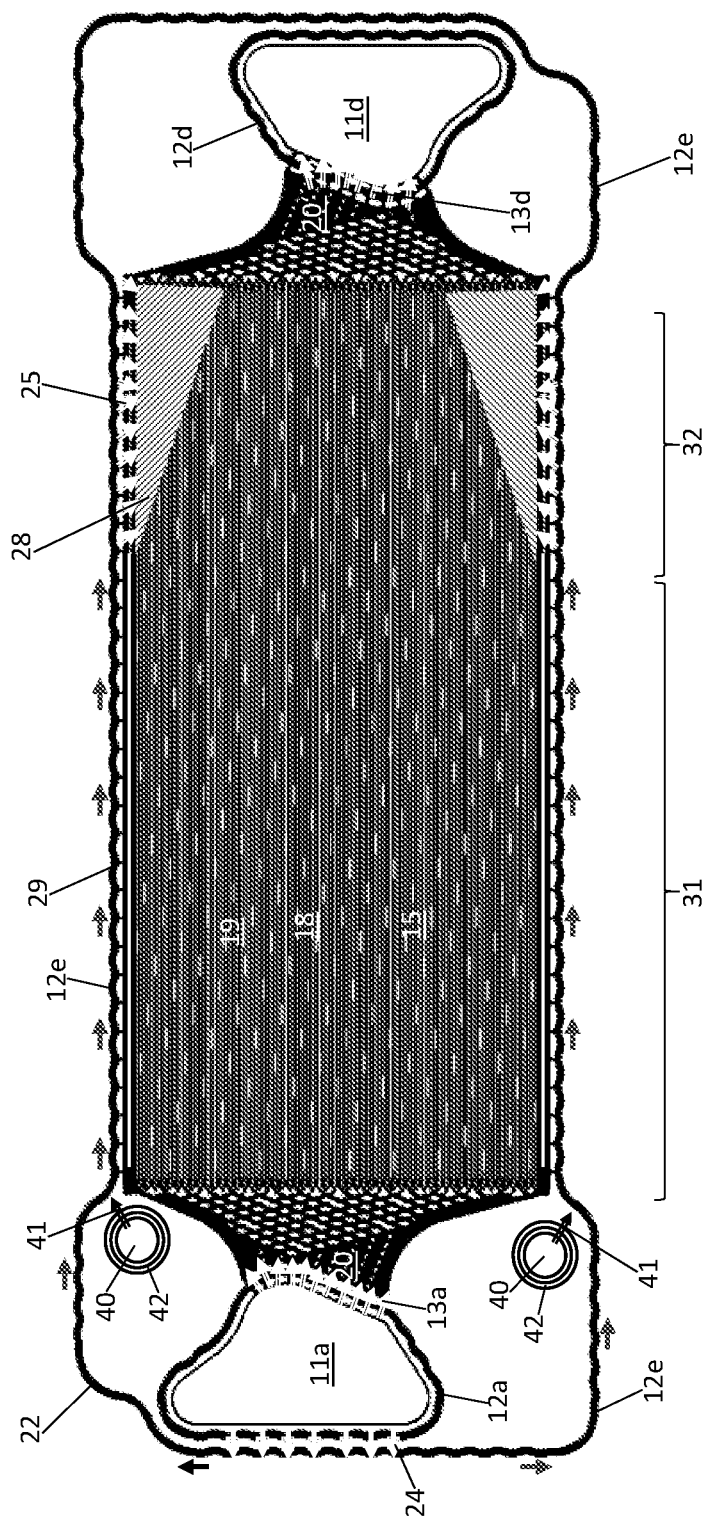
Figure 8:
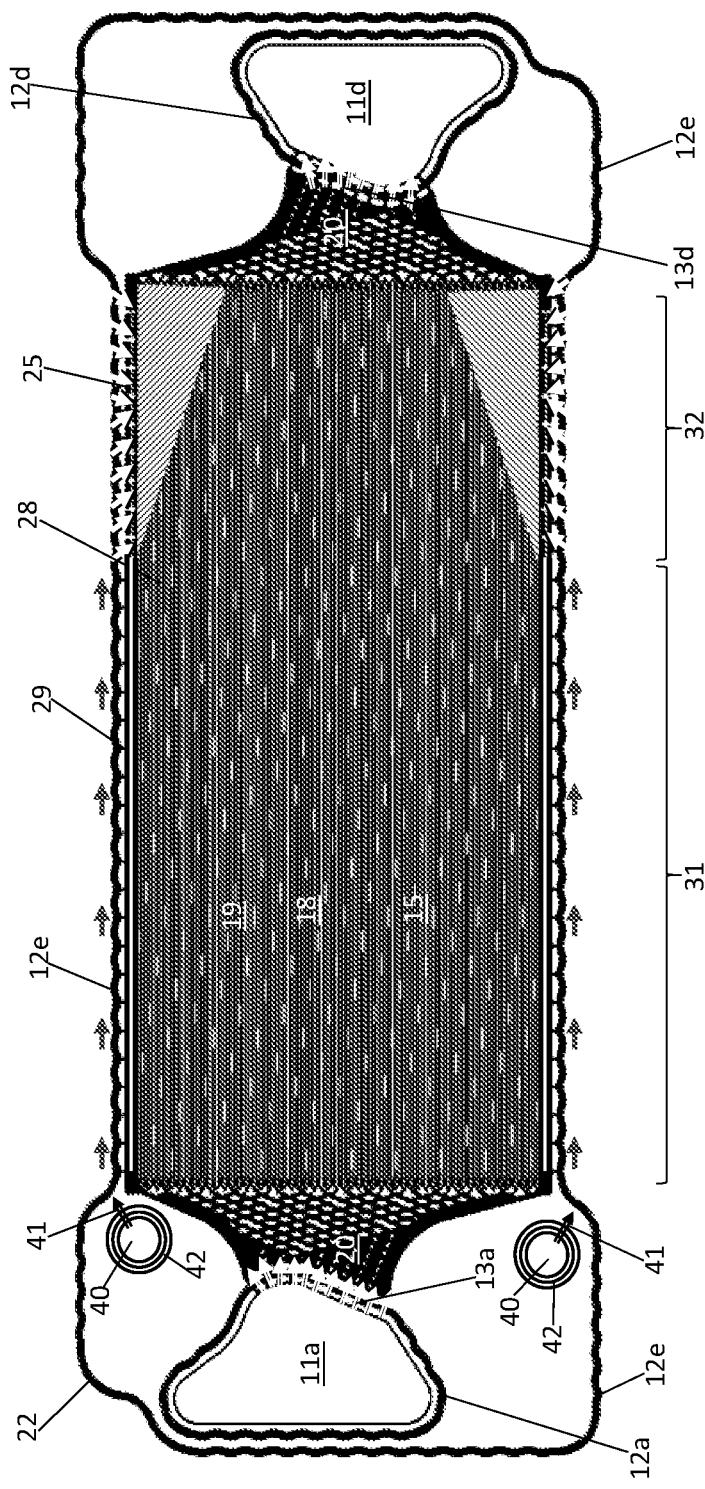
Figure 10:
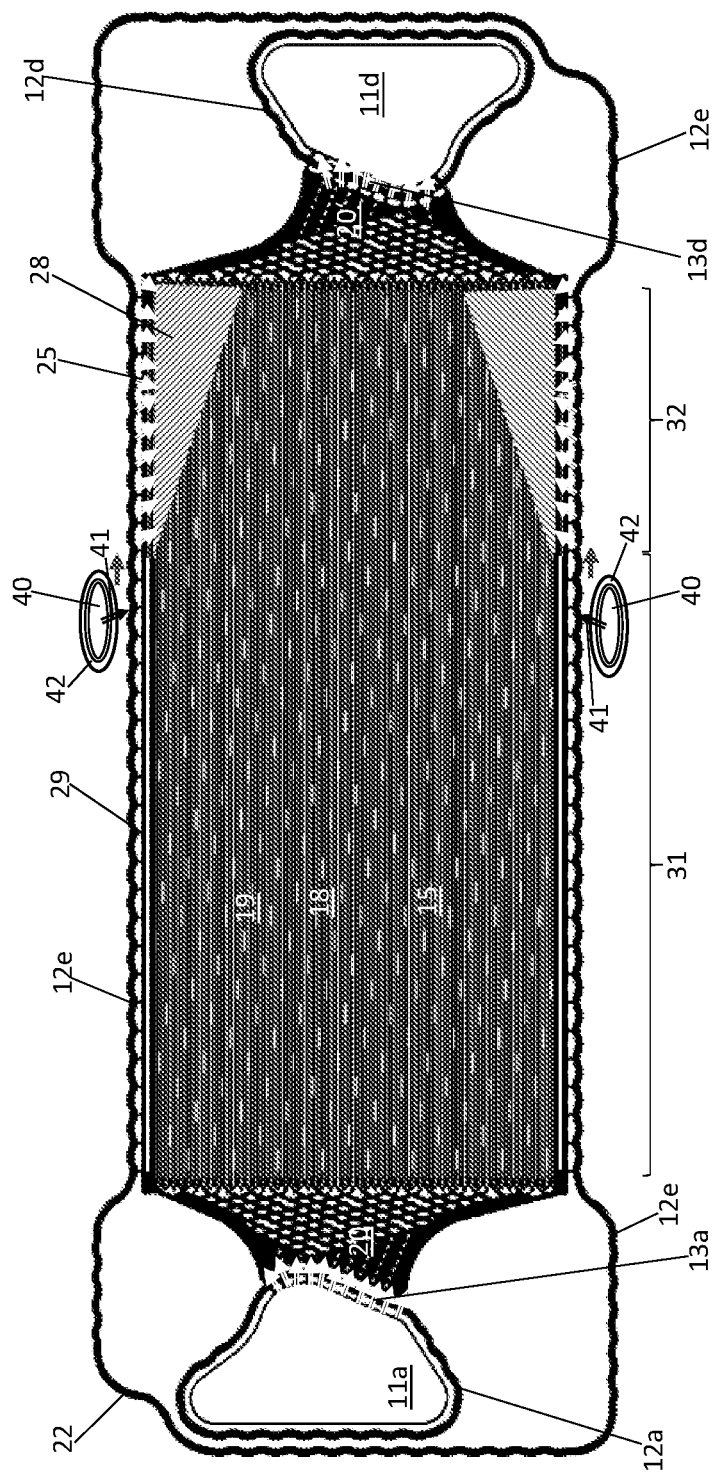
Figure 11:
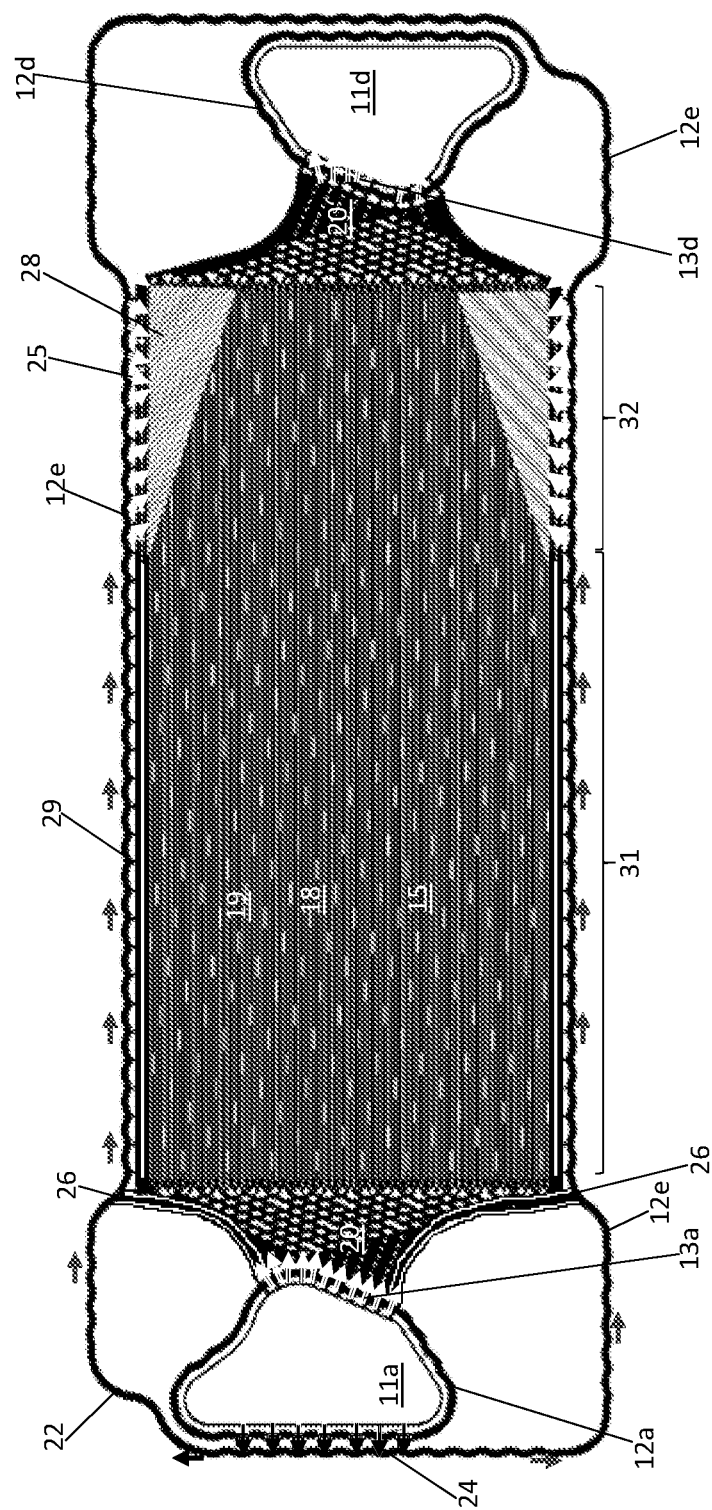

In the embodiments of FIGS. 8, 9 and 10, the coolant is conducted only via the additional cooling inlet openings 40 into the bead interior 22, while in the embodiment of FIG. 7 the coolant flow into the bead interior 22 results from a combination of the inlet opening 11a and the cooling inlet openings 40.

It is clear in all the embodiments of FIGS. 3-12 that some of the cooling medium, usually even most of the cooling medium, does not enter the bead interior 22 from the inlet opening 11a in order to continue to flow therein along the course of the bead, but instead flows via the passage 13a to the distribution region 20 and onwards into the cavity 19 of the active region 18.

The electrochemical system shown in FIG. 1 can of course be used with the bipolar plates 2 according to the disclosure.

FIGS. 1-18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" and "substantially" is construed to mean plus or minus five percent of the range unless otherwise specified. As used herein, the term "substantially" is construed to mean nearly an entirety or 90% of an entirety. For example, substantially an entire flow would be greater than 90% of a flow.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SIGNS 1 electrochemical system
2 bipolar plate
2a individual plate
2b individual plate
3 end plate
4 end plate
5 media port
6 stack
7 z-direction
8 x-direction
9 y-direction
10 membrane electrode assembly
11a-d through-openings
12a-e sealing beads
13a-d passages
14 first structures
15 second structures
17 flow field
18 electrochemically active region
19 cavity
20 distribution and/or collection region
20' collection region
22 bead interior
24 third structure
25 fourth structure
26 line from the inlet opening 11a to the bead interior 22
27 welded joint
28 connecting channel
29 limiting element
31 front section
32 rear section
33 middle section
40 inlet opening
41 fluid channel
42 sealing bead

The invention claimed is:

1. A bipolar plate for an electrochemical system, comprising:
   two separator plates;
   at least one inlet opening which introduces a cooling medium;
   an outlet opening which discharges the cooling medium; and
   in at least a first of the separator plates,
      an active region having first structures which guide a reaction medium along an outer side of the bipolar plate and second structures which guide the cooling medium along an inner side of the bipolar plate; and
      a closed perimeter bead sealing off at least the active region, the perimeter bead extending around the active region and the outlet opening and defining a bead interior,
      fourth structures connecting the bead interior of the perimeter bead to the active region such that the cooling medium flows from the bead interior to the active region, and
      an interior flank of the perimeter bead sealing off the bead interior of the perimeter bead so that flow of the cooling medium from the bead interior into the outlet opening is prevented outside of the fourth structures,
   wherein the active region of at least the first separator plate comprises:
      a first section arranged on a side of the respective separator plate near the inlet opening, and
      a second section arranged on a side of the respective separator plate near the outlet opening and arranged between the outlet opening and a front section,
   wherein the fourth structures leading away from the perimeter bead are arranged between the perimeter bead and the second section such that at least some of the cooling medium flowing through the bead interior is guided past the first section of the active region and flows laterally into the second section.

2. The bipolar plate according to claim 1, wherein the perimeter bead seals off the outlet opening with respect to the bead interior.

3. The bipolar plate according to claim 1, further comprising a first bead arrangement arranged around the outlet opening at least in the first of the two separator plates, wherein a part of the bead arrangement that faces towards the perimeter bead and away from the active region seals off the outlet opening with respect to the bead interior.

4. The bipolar plate according to claim 1, wherein the perimeter bead is configured as an outermost sealing element at least along the longitudinal sides of the respective separator plate and in the region of the coolant outlet opening, and/or
   wherein the inlet opening is fluidically connected to the bead interior of the perimeter bead.

5. The bipolar plate according to claim 4, further comprising at least one third structure leading from the inlet opening to the perimeter bead at least in the first of the two separator plates, the at least one third structure guiding cooling medium from the inlet opening into the bead interior.

6. The bipolar plate according to claim 5, wherein the third structure is configured as an embossed structure.

7. The bipolar plate according to claim 5, further comprising:
   a second bead arrangement arranged around the inlet opening at least in the first of the two separator plates, the second bead arrangement sealing off the inlet opening, each of two bead flanks of the second bead arrangement having at least one passage which allows the cooling medium to flow through the bead flanks, wherein the third structure is configured as a flow channel which, on an outer side of the second bead arrangement, adjoins the passage in the bead flank and is fluidically connected to the bead interior of the perimeter bead via a further passage in the bead flank of the perimeter bead.

8. A bipolar plate for an electrochemical system, comprising:

two separator plates;

at least one inlet opening which introduces a cooling medium;

an outlet opening which discharges the cooling medium; and in at least a first of the separator plates, an active region having first structures which guide a reaction medium along an outer side of the bipolar plate and second structures which guide the cooling medium along an inner side of the bipolar plate; and a closed perimeter bead sealing off at least the active region, the perimeter bead extending around the active region and the outlet opening and defining a bead interior, an interior flank of the perimeter bead sealing off the bead interior of the perimeter bead so that flow of the cooling medium from the bead interior into the outlet opening is prevented outside of the fourth structures, and fourth structures leading away from the perimeter bead, the fourth structures allowing cooling medium to flow from the bead interior to the active region, wherein the active region of at least the first separator plate comprises:

a front section arranged on a side of the respective separator plate near the inlet opening, a rear section arranged on a side of the respective separator plate near the outlet opening and arranged between the outlet opening and the front section, and a middle section arranged between the front section and the rear section, wherein the fourth structures leading away from the perimeter bead are arranged between the perimeter bead and the rear section such that at least some or most of the cooling medium flowing through the bead interior is guided past the front section of the active region and flows laterally into the rear section.

9. The bipolar plate according to claim 8, wherein only some of the cooling medium flowing through the bead interior is guided past the front section and some of the cooling medium flowing through the bead interior is introduced laterally already in the front section.

10. The bipolar plate according to claim 1, wherein the second structures comprise channel structures which guide the cooling medium, which define a longitudinal flow direction of the cooling medium, and wherein connecting channels for the cooling medium are provided in the active region, said connecting channels fluidically connecting adjacent channel structures to one another and enabling a flow direction of the cooling medium at an angle to the longitudinal flow direction.

11. The bipolar plate according to claim 10, wherein the first structures in the active region on the outer side of the bipolar plate comprise channel structures for guiding the reaction medium, and wherein the channel structures comprise cross-sectional constrictions in some areas, which on the inner side of the bipolar plate form the connecting channels for the cooling medium.

12. The bipolar plate according to claim 1, wherein, at least in the first separator plate, limiting elements are arranged between the active region and the perimeter bead and are configured to reduce or prevent a flow of reaction medium on the outer side along the perimeter bead and past the active region.

13. The bipolar plate according to claim 12, wherein the limiting elements form a fluidic connection between the bead interior and the second structure of the inner side of the active region so that the cooling medium can flow from the bead interior towards the second structures.

14. The bipolar plate according to claim 1, wherein the perimeter bead extends in part between the inlet opening and the active region.

15. The bipolar plate according to claim 1, further comprising a further inlet opening for the cooling medium, which is only fluidically connected to the bead interior of the perimeter bead.

16. The bipolar plate according to claim 1, further comprising at least one welded joint or weld, which connects the separator plates to one another and is arranged between the outlet opening and the perimeter bead.

* * * * *